US012030767B2

(12) United States Patent
Van Geijlswijk

(10) Patent No.: US 12,030,767 B2
(45) Date of Patent: Jul. 9, 2024

(54) DEVICE FOR COOLING A BEVERAGE COMPRISING A BUFFER MODULE

(71) Applicant: Heineken Supply Chain B.V., Amsterdam (NL)

(72) Inventor: Petrus Johannes Van Geijlswijk, Voorschoten (NL)

(73) Assignee: Heineken Supply Chain B. V., Amsterdam (NL)

( * ) Notice: Subject to any disclaimer, the term of this patent is extended or adjusted under 35 U.S.C. 154(b) by 0 days.

(21) Appl. No.: 18/022,789

(22) PCT Filed: Sep. 3, 2021

(86) PCT No.: PCT/NL2021/050538
§ 371 (c)(1),
(2) Date: Feb. 23, 2023

(87) PCT Pub. No.: WO2022/050844
PCT Pub. Date: Mar. 10, 2022

(65) Prior Publication Data

US 2023/0312325 A1 Oct. 5, 2023

(30) Foreign Application Priority Data

Sep. 3, 2020 (EP) ..................................... 20194439

(51) Int. Cl.
*B67D 1/08* (2006.01)

(52) U.S. Cl.
CPC .. *B67D 1/0861* (2013.01); *B67D 2210/00104* (2013.01)

(58) Field of Classification Search
CPC .................... B67D 1/0861; B67D 2210/00104
See application file for complete search history.

(56) References Cited

U.S. PATENT DOCUMENTS 4,655,050 A * 4/1987 Aschberger ............... F25B 5/02 62/200
7,244,458 B1 * 7/2007 Scullion ................... B67D 1/06 426/238

FOREIGN PATENT DOCUMENTS

EP 1627849 A1 2/2006
EP 2207459 B1 4/2013
WO 2007096609 A2 8/2007

OTHER PUBLICATIONS

International Search Report and Written Opinion issued in corresponding application No. PCT/NL2021/050538 dated Jan. 28, 2022, 10 pages.

* cited by examiner

*Primary Examiner* — Donnell A Long
(74) *Attorney, Agent, or Firm* — Pearne & Gordon LLP

(57) ABSTRACT

A cooling device comprises a buffer circuit comprising a cooling unit for cooling coolant and a reservoir for buffering cooled coolant and a primary cooling circuit for providing coolant to a first heat exchanger. The first heat exchanger is arranged for exchange of thermal energy between the coolant and beverage in a dispensing line. The primary cooling circuit and the buffer circuit are connected to enable exchange of coolant. The cooling device comprises a coolant distribution module arrange to control exchange of coolant between the primary cooling circuit and the buffer circuit. The coolant distribution module may control at least one of valves as passive components and pumps as active components, in at least one of the primary cooling circuit and the buffer circuit. The coolant distribution module may operate based on coolant temperature in the primary cooling circuit.

20 Claims, 3 Drawing Sheets

DEVICE FOR COOLING A BEVERAGE COMPRISING A BUFFER MODULE

TECHNICAL FIELD

The invention relates to devices for cooling a beverage.

BACKGROUND

EP2207459B1 discloses a device for cooling a beverage. Beer is transported through a dispensing line in the device and cooled in a heat exchanger where it becomes supercooled. Upstream of the heat exchanger, the dispensing line is located in an insulated casing. Delivery and return pipes carrying coolant to the heat exchanger are located in the same casing as the dispensing line.

EP1627849A1 discloses a dispensing system for dispensing a chilled beverage. The system has a dispense point with multiple outlets connected to separate beverage supply lines, each supply line being connected to one side of their own plate heat exchanger. The plate heat exchangers are each connected in parallel to a coolant supply to cool the beverage to a desired temperature.

SUMMARY

When the temperature of the coolant in the device of EP2207459B1 decreases below a freezing point of the beverage, beverage inside the dispensing line freezes. The frozen beverage subsequently blocks further flow of beverage through the dispensing line.

In the device of EP1627849A1, coolant flowing past a plate heat exchanger always directly returns to the coolant supply. As such, circulation of coolant through the heat exchangers is only possible via the coolant supply. The flow path for coolant to the plate heat exchangers, which are connected parallel to the coolant supply, is only a circuit in combination with the coolant supply circuit. A circuit implies the presence of a closed loop flow path, allowing circulation of coolant. Circulation implies that the coolant can follow a course that returns to the starting point, wherein the starting point and the entire flow path is provided by the same circuit.

It is preferred to provide a device for cooling a beverage, which may allow for better control of the temperature of the beverage.

A first aspect provides a first embodiment of a cooling device for cooling a beverage. The cooling device comprising a dispensing line comprising a beverage inlet at a proximal end of the dispensing line for receiving the beverage and a beverage outlet for dispensing the beverage, the dispensing line providing a beverage flow path between the beverage inlet and the beverage outlet.

The cooling device further comprises a cooling module comprising a primary cooling circuit arranged to provide a primary cooling flow path for coolant fluid, a first heat exchanger arranged to exchange thermal energy with coolant fluid flowing through the primary cooling circuit, a primary cooling flow controller for controlling a flow of coolant fluid in the primary cooling circuit, a second heat exchanger arranged to allow exchange of thermal energy between beverage flowing through the dispensing line and coolant fluid flowing through the primary cooling circuit, a secondary cooling circuit, providing a secondary cooling flow path for coolant fluid, a secondary cooling flow controller for controlling a flow of coolant fluid in the secondary cooling circuit, and a third heat exchanger, arranged to allow exchange of thermal energy between beverage flowing through the dispensing line and coolant fluid flowing through the secondary cooling circuit.

Examples of beverages which may be cooled by the cooling device are alcoholic and non-alcoholic beverages, for example beer, cider, soft drinks, other brewed beverages, or any other beverage which may be carbonated or non-carbonated.

Embodiments of the cooling device may be arranged to cool the beverage down to a temperature below 10° C., below 5° C., or even below a freezing point of a beverage at ambient pressure, such as below −3° C. or even below −5° C. Hence, the cooling device may be used to dispense a beverage in a supercooled state if the appropriate pressure is applied to the beverage. The cooling device may thus be a cooling device for cooling a beverage down to a supercooled temperature. A supercooled beverage may be defined as a beverage with a temperature lower than its melting point, while the beverage is still in the fluid phase.

In the context of this description, a fluid may comprise matter which is a liquid or vapour state, or in a combination of these states. Examples of coolant fluids are glycol, carbon-dioxide, alcohol, any other coolant fluid, or any combination thereof.

The dispensing line is used to transport beverage through. The dispensing line may for example comprise tubing with a constant or non-constant flow through area. At the beverage inlet, a coupler may be present to couple the beverage inlet to a beverage container such as a keg or a tank. At the beverage outlet, a coupler may be present to couple the beverage outlet to a beverage dispenser, for example a beer tap.

A circuit, such as a cooling circuit or a buffer circuit, may comprise any number of conduits, tubes, transportation lines, and/or other type of pipe arranged for carrying a flow of fluid therethrough. Different sections of a circuit may have different flow through areas, and a transition in flow through area may constitute a pressure difference in the coolant fluid, following the well-known Bernoulli's principle.

A heat exchanger may be defined as a device arranged to exchange thermal energy between two fluid flows. Thermal energy may be transferred from the fluid flow with the higher temperature to the fluid flow with the lower temperature. Thermal energy may for example be transferred by virtue of conduction through the heat exchanger.

Any heat exchanger may for example be arranged as a parallel or counterflow heat exchanger. Examples of types of heat exchangers which may be used are shell-and-tube, tube-in-tube, helical coil, any other type, or any combination thereof.

A flow controller, for example a cooling flow controller, may comprise one or more pumps and/or one or more valves. Different components of a single flow controller may be provided at different positions along a circuit. A valve may be placed upstream or downstream of a pump comprised by the same flow controller as said valve.

Any valve may be a flow control valve, for example a cooling flow control valve, which can be controlled between a closed state in which flow through the valve is blocked, and an open state in which flow through the valve is allowed. Intermediate positions between open and closed may also be allowed, and in such cases a flow rate through the valve may be controlled more specifically.

Relative to the beverage flow path, the third heat exchanger may be provided downstream of the second heat exchanger. Beverage flowing through the dispensing line may hence first be cooled by the second heat exchanger, and next be cooled by the third heat exchanger. Relative to the dispensing line, the second heat exchanger and the third heat exchanger may thus be placed in series.

When the cooling device comprises a first temperature sensor for sensing a temperature of coolant fluid flowing through the secondary cooling circuit, the secondary cooling flow controller may be arranged for controlling the flow of coolant fluid through the secondary cooling circuit in response to the temperature sensed by the first temperature sensor.

Any temperature sensor may be placed inside a circuit for directly sensing a temperature of fluid present in the circuit. Alternatively, a temperature sensor may be arranged to sense a temperature of a particular section of the circuit itself. The temperature of the section of the circuit may be indicative of the temperature of fluid flowing through said section.

In a particular example, the first temperature sensor may be arranged for sensing a temperature of the cooling fluid flowing through the secondary cooling circuit, downstream of the third heat exchanger.

The secondary cooling circuit may be connected to the primary cooling circuit at two ends of the secondary cooling circuit. The primary cooling flow controller may comprise a pump, and a first of the two ends may be connected downstream of the pump. A second of the two ends may be connected upstream of the pump. As such, the pump of the primary cooling flow controller may be used to constitute a flow of coolant fluid between the two ends of the secondary cooling circuit.

Embodiments of the cooling device may comprise a vapour compression cooling system arranged to withdraw thermal energy from one or more heat exchangers comprised by the cooling device, such as the first heat exchanger.

In further embodiments, the first heat exchanger may comprise a fluid inlet for receiving coolant from a vapour compression cooling system, and a fluid outlet for supply coolant back to the vapour compression cooling system.

A second aspect provides a second embodiment of a cooling device. This embodiment of the cooling device for cooling a beverage comprises a dispensing line comprising a beverage inlet at a proximal end of the dispensing line for receiving the beverage and a beverage outlet for dispensing the beverage, the dispensing line providing a beverage flow path between the beverage inlet and the beverage outlet.

The cooling device according to the second aspect further comprises a buffer module comprising a buffer circuit arranged to provide a buffer flow path for circulating coolant fluid, a buffer heat exchanger arranged to exchange thermal energy with coolant fluid flowing through the buffer circuit, a buffer container for storing coolant fluid and a buffer flow module controller for controlling a flow of coolant fluid in the buffer circuit.

Further comprised by the cooling device according to the second aspect is a cooling module, comprising a primary cooling circuit providing a primary cooling flow path for circulating coolant fluid, a primary cooling heat exchanger arranged to allow exchange of thermal energy between beverage flowing through the dispensing line and coolant fluid flowing through the primary cooling circuit, a primary cooling flow module for controlling a flow of coolant fluid through the primary cooling circuit. Also comprised by the cooling device are a supply conduit providing a supply flow path for coolant fluid between the buffer circuit and the primary cooling circuit, upstream of the primary cooling flow controller and a return conduit providing a return flow path for coolant fluid between the buffer circuit and the primary cooling circuit, downstream of the primary cooling heat exchanger.

By virtue of the buffer module, an increase amount of cooled coolant fluid may be present in the cooling device, compared to only the amount of coolant fluid present in the buffer circuit. This may increase the cooling capacity of the cooling device, and/or increase the accuracy with which beverage may be cooled to a particular temperature or within a particular temperature window.

Coolant fluid inside the buffer module may be mixed into the cooling module by means of the flow modules, to control the temperature of coolant fluid in the cooling module. In general, since coolant fluid in the cooling module is used to extract thermal energy from the beverage, the temperature of coolant fluid in the cooling module may be higher than the temperature of coolant fluid in the buffer module.

In general, a flow module or cooling flow module may comprise a pump and/or a valve, more than one pump, more than one valve, in any combination thereof. A flow module or cooling flow module is used to constitute a flow of fluid, for example by constituting a pressure difference, for example using a pump, or making use of an already present pressure difference, for example using a valve.

Because coolant fluid in the buffer circuit may not be used to directly cool the beverage, the temperature of the coolant fluid in the buffer circuit may fall below a freezing point of the beverage. With this lower temperature of the coolant fluid, a larger cooling capacity over a longer amount of time may be achieved compared to when all coolant fluid in the cooling device has to be kept above the freezing point of the beverage—to completely prevent beverage from freezing in the dispensing line.

When the cooling device comprises a buffer module, it may be preferred to control the temperature of coolant fluid in the cooling module above a freezing point of the beverage. Such a control strategy may prevent beverage from freezing inside the dispensing line. The skilled person will appreciate that the freezing point or freezing trajectory of the beverage may depend on the composition of the beverage—for example sugar content, dissolved gas content and/or alcohol content—but also on the pressure applied to the beverage.

The cooling device according to the second aspect may comprise a first temperature sensor for sensing a first temperature of coolant fluid flowing through the primary cooling circuit. In particular, the first temperature sensor may be arranged for sensing a temperature of the cooling fluid flowing through the secondary cooling circuit, downstream of the primary cooling heat exchanger.

Embodiments of the cooling device may comprise a processing unit arranged to control the buffer flow module and the primary cooling flow module to perform at least one of decreasing throughput of the buffer flow module and increasing throughput of the primary cooling flow module if the first temperature meets a first requirement and increasing throughput of the buffer flow module and decreasing throughput of the primary cooling flow module if a further requirement is met. This may be executed by controlling the recirculation valve and the connection valve, such that the temperature of the beverage at the beverage outlet may be controlled by controlling a flow rate of coolant fluid through one or more parts of the cooling device—for example through the buffer circuit and the primary cooling circuit.

As an option, embodiments of the cooling device may comprise a secondary cooling circuit providing a secondary cooling flow path for coolant fluid, and a secondary cooling heat exchanger arranged to allow exchange of thermal energy between beverage flowing through the dispensing line and coolant fluid flowing through the secondary cooling circuit, wherein the secondary cooling circuit is connected parallel to the primary cooling circuit, and the secondary cooling heat exchanger is provided in thermally conductive contact with the dispensing line downstream of the primary cooling heat exchanger.

When a cooling device comprises the secondary cooling circuit, even more accurate control of the beverage at the dispensing line may be obtained.

The secondary cooling heat exchanger may be arranged as a sleeve surrounding part of the dispensing line downstream of the primary cooling heat exchanger, and thus insulating this part of the dispensing line. The insulation may prevent the temperature of the beverage in the part of the dispensing line from increasing at an undesired rate due to the ambient temperature surrounding the dispensing line.

When the secondary cooling heat exchanger is arranged as a sleeve surrounding part of the dispensing line, coolant fluid may flow through the sleeve, between an outer wall of the dispensing line and an inner wall of the sleeve.

When a cooling device comprises the secondary cooling circuit, the cooling device may comprise a second temperature sensor arranged for sensing a temperature of cooling fluid flowing through the secondary cooling circuit, and a secondary cooling flow controller arranged to control a flow of coolant fluid through the secondary cooling circuit in response to the temperature sensed by the second temperature sensor.

By virtue of the secondary cooling flow controller, a flow rate of coolant fluid through the secondary cooling circuit may be controlled relative to the primary cooling flow controller.

As an option, the secondary cooling circuit is connected to the primary cooling circuit upstream of the primary cooling flow controller and downstream of the primary cooling flow controller. As such, the primary cooling flow controller, for example a pump comprised thereby, may be used to also constitute a flow of coolant fluid through the secondary cooling circuit.

As a further option for embodiments of the cooling device, the cooling device may comprise a tertiary cooling circuit providing a tertiary cooling flow path for coolant fluid, a third or tertiary cooling heat exchanger arranged to allow exchange of thermal energy between beverage flowing through the dispensing line and coolant fluid flowing through the tertiary cooling circuit, and a tertiary cooling flow controller for controlling a flow of coolant fluid through the tertiary cooling circuit, wherein the tertiary cooling circuit is in fluid connection with the buffer circuit.

In general, one circuit being in fluid connection with another circuit may imply that fluid may flow directly between the two circuits. A fluid connection may also be achieved indirectly, for example via one or more additional circuits, conduits and/or other components.

By virtue of the tertiary cooling circuit, an even more accurate control of the temperature of the beverage at the beverage outlet may be obtained.

Embodiments of cooling devices are envisioned comprising only one of the secondary cooling circuit and the tertiary cooling circuit, or both the secondary cooling circuit and the tertiary cooling circuit.

The tertiary cooling circuit may be connected between the supply conduit and the return conduit. Alternatively, the tertiary cooling circuit may be connected between the primary cooling circuit and the secondary cooling circuit.

When the cooling device comprises a secondary cooling heat exchanger, the secondary cooling heat exchanger may be positioned downstream or upstream of the primary cooling heat exchanger.

When the cooling device comprises a third or tertiary cooling heat exchanger, the third or tertiary cooling heat exchanger may be positioned downstream or upstream of the primary cooling heat exchanger.

In general, a cooling device may comprise any number of cooling heat exchangers with any number of cooling circuits. Cooling heat exchangers and cooling circuits may be embodied corresponding to any other heat exchanger and cooling circuit disclosed in the present description.

Features disclosed in conjunction with embodiments of the cooling device according to the first aspect may readily be applied to embodiments of the cooling device according to the second aspect, and vice versa.

BRIEF DESCRIPTION OF THE FIGURES

Aspects and embodiments thereof will be elucidated in conjunction with figures. In the figures.

DETAILED DESCRIPTION

Figure 1:
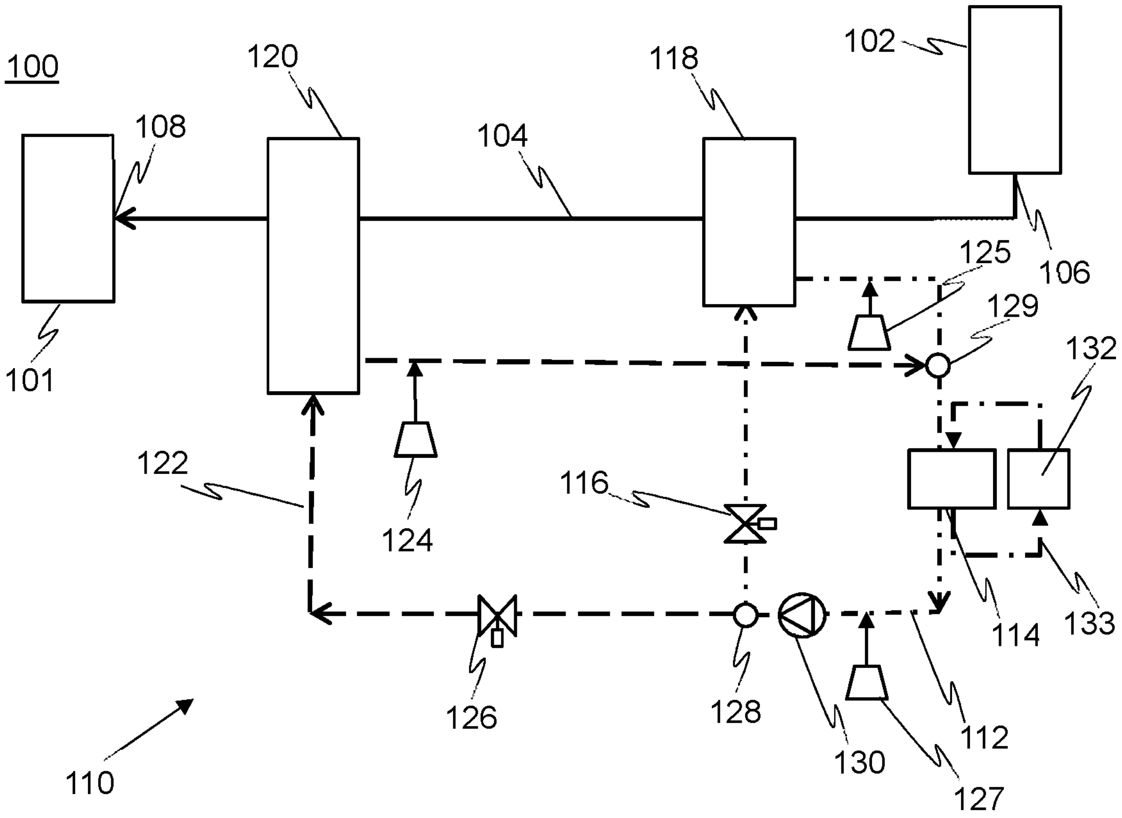
FIG. 1 shows an embodiment of a cooling device according to the first aspect.

In general, in the figures, the following legend is adhered to:

Solid line=beverage line (104)
Dashed line=buffer cooling circuit (202)
Dash-dotted line=primary cooling circuit (112, 212)
Long dash line=secondary cooling circuit (122, 226)
Dash-dot-dotted line=tertiary cooling circuit (232)
Long dash-dotted=compressive cooling circuit (133)
Dotted line=return/supply conduits (218, 220)

Arrows drawn on ends of circuits and lines in the figures indicate a preferred flow direction for coolant fluid or beverage. However, cooling states may be envisioned which do not comply with one or more of the arrow directions as indicated in the figures. Hence, the arrows are not to be construed as limiting to the scope of aspects and embodiments described herein.

FIG. 1 shows an embodiment of a device 100 for cooling a beverage, according to the first aspect. The cooling device 100 comprises a dispensing line 104 comprising a beverage inlet 106 at a proximal end of the dispensing line for receiving the beverage and a beverage outlet 108 for dispensing the beverage. Between the beverage inlet 106 and the beverage outlet 108, a beverage flow path is provided by the dispensing line 104. At the beverage outlet 108, a tap 101 is provided, which may comprise a dedicated valve for correct dispensing of the beverage in container, like a glass.

FIG. 1 shows a keg 102 as an example of a beverage supply container connected to the beverage inlet 106 of the cooling device 100. Furthermore, shown in FIG. 1 is a beverage dispenser 108, connected to the beverage outlet 108 of the cooling device 100. As such, beverage may flow from the keg 102 through the cooling device 100 out of the beverage dispenser 108. While flowing through the cooling device 100, the temperature of the beverage may be lowered to a desired dispensing temperature.

The cooling device 100 of FIG. 1 comprises a cooling module 110. The cooling module 110 may be used to extract thermal energy from beverage flowing through the dispensing line 104, in order to lower the temperature of the beverage to a desired temperature. In particular, the cooling module 110 may comprise a second heat exchanger 118 arranged to allow exchange of thermal energy between beverage flowing through the dispensing line 104 and coolant fluid flowing through the primary cooling circuit 112.

The dispensing line 104 may be releasably provided in the device 100 and in releasable contact with the second heat exchanger 118 and other heat exchangers in particular. In such implementation, a disposable dispensing line 104 may employed to remove or reduce a need for cleaning of the dispensing line in the device 100. Through or in the heat exchanger or heat exchangers, a duct may be provided through which dispensing line 104 may be provided. In such embodiment, the duct for receiving the dispensing line 104 is preferably thermally conductive.

The cooling module 110 comprises a first heat exchanger 114 arranged to exchange thermal energy with coolant fluid flowing through the primary cooling circuit. The first heat exchanger 114 may be used for cooling the coolant fluid flowing through the primary cooling circuit.

The cooling module 110 further comprises a primary pump 130 and a primary valve 116 as a primary cooling flow controller, for controlling a flow of coolant fluid in the primary cooling circuit 112. When the primary valve 116 is in an open state, allowing flow of coolant fluid through the primary valve 116, the primary pump 130 may be controlled to cause circulation of coolant fluid. Coolant fluid may flow through the primary pump 130, through the valve 116, through the second heat exchanger 118 for cooling beverage in the dispensing line 104, through the first heat exchanger 114 and back to the pump 130.

The cooling module 110 also comprises a secondary cooling circuit 122, providing a secondary cooling flow path for coolant fluid parallel to the primary cooling circuit 112. A secondary valve 126 is provided as a secondary cooling flow controller for controlling a flow of coolant fluid in the secondary cooling circuit 122.

In the secondary cooling circuit 122, a third heat exchanger 120 is placed. This third heat exchanger 120 allows exchange of thermal energy between beverage flowing through the dispensing line 104 and coolant fluid flowing through the secondary cooling circuit 122.

As an option, depicted in FIG. 1, the secondary cooling circuit 122 is connected to the primary cooling circuit 112 at two ends 128, 129 of the secondary cooling circuit 122. In particular, a first end 128 is connected upstream of the primary valve 116. The second end 129 is as a further option connected downstream of the second heat exchanger 118, and upstream of the first heat exchanger 114.

When the secondary valve 126 is in an open state, flow of coolant fluid is allowed through the secondary valve 126. A pressure on the coolant fluid upstream of the secondary valve 126 may exceed the pressure on the coolant fluid downstream of the secondary valve 126, for example by virtue of pump 130. In such a case, coolant fluid may flow from the primary cooling circuit 112 through the secondary valve 126, through the third heat exchanger 120, back to the primary cooling circuit 112. As such, a secondary cooling flow path for coolant fluid is provided parallel to the primary cooling circuit 112.

In the particular embodiment of FIG. 1, as an option also applicable to other heat exchangers in other embodiments of cooling devices, a vapour compression cooling system 132 is provided, arranged to withdraw thermal energy from the first heat exchanger 114. The vapour compression cooling system 132 may comprise a compressor, condenser, expansion valve, and an evaporator. In general, in embodiments of cooling devices, a vapour compression cooling system may be used in conjunction with any heat exchanger to extract thermal energy from said heat exchanger.

A vapour compression cooling system 132 may be provided with a compressive cooling circuit 133. The compressive cooling circuit may flow through the heat exchanger which the vapour compression cooling system is arranged to exchange thermal energy with.

As an option applicable to any embodiment of the cooling device 100 comprising a vapour compression cooling system 132 discussed above and below or otherwise disclosed by this application, one or more or all components of the vapour compression cooling system 132 may be provided in the primary cooling circuit 112. As such, the coolant fluid flowing through the primary cooling circuit 112 may be compressed, cooled, and expanded again in other to lower the temperature of the coolant fluid.

As shown in FIG. 1, relative to the beverage flow path, the third heat exchanger 120 is placed downstream of the second heat exchanger 118. Embodiments are also envisioned wherein the third heat exchanger 120 is placed upstream of the second heat exchanger 118. In either case, the third heat exchanger 120 may be placed in series with the second heat exchanger 118 relative to the beverage flow path through the dispensing line 104.

As an option depicted in FIG. 1, the cooling device 100 further comprises a first temperature sensor 124 for sensing a temperature of coolant fluid flowing through the secondary cooling circuit 122. In this particular embodiment, the first temperature sensor 124 is positioned downstream of the third heat exchanger 120.

The cooling device 100 may comprise a control unit arranged to receive temperature signals from the various temperature sensors comprised by the device, the values of the temperature signals being indicative of the sensed temperatures, and to control the valves, pumps and other flow control units comprised by the device 100 in response to the temperature values of the received temperature signals. The control unit may be implemented as an electronic control unit like a microcontroller, but also as a mechanical controller like a bimetal switch. In other implementations, the temperature of the beverage may be sensed and used to control the valves, pumps and other flow control units.

If the first temperature sensor 124 senses a temperature above a particular threshold, this may be indicative that the beverage in the dispensing line may not be cooled to the desired temperature anymore. In response, more thermal energy may be withdrawn from the coolant fluid at the first heat exchanger 114 to lower the temperature of the coolant fluid and/or a flow rate of the coolant fluid may be increased to increase the cooling capacity of one or both of the second heat exchanger 118 and the third heat exchanger 120.

In particular, the secondary cooling flow controller 126 may be arranged for controlling the flow of coolant fluid through the secondary cooling circuit 122 in response to the temperature sensed by the first temperature sensor 124 or other temperature sensors—though also other flow controllers may be operated in response.

In general, a cooling device 100 may comprise any number of temperature sensors, placed in or at any position in any cooling circuit. For example, FIG. 1 shows a second temperature sensor 125 for sensing a temperature of coolant fluid flowing through the primary cooling circuit 112. The second temperature sensor 125 is placed downstream of the second heat exchanger 118.

As another example, a third temperature sensor 127 is placed in the primary cooling circuit 112, downstream of the first heat exchanger 114 and optionally upstream of the pump 130.

Because the second heat exchanger 118 and the third heat exchanger 120 are in the embodiment of FIG. 1 positioned parallel relative to the first heat exchanger 114, precise control of the temperature of the beverage at the beverage outlet 108 may be achieved. By controlling the first valve 116, the second valve 126, and the pump 130, the amount of cooling applied to the beverage in the dispensing line 104 may be controlled.

Selectively, for example, in a primary cooling state, coolant fluid may be circulated only in the primary cooling circuit 112. In a secondary cooling state, with the first valve 116 in a closed state, coolant fluid may be circulated only in the secondary cooling circuit 122. In a third cooling state, with the first valve 116 and the second valve 126 in an open state, coolant fluid may be circulated through both the primary cooling circuit 112 and the secondary cooling circuit 122.

In a particular mode of operation, the primary cooling circuit 112 is operated to ensure that a fluid in the dispensing line 104 is cooled to a temperature within a pre-determined window, by means of the second heat exchanger 118. At certain scenarios, the temperature of a beverage in the keg 102 may vary between 5° C. and 40° C., depending on temperature of the environment of the keg 102 or an environment in which the keg 102 has been stored. The beverage is subsequently cooled to a temperature between 2° C. and 4° C.

Subsequently, the beverage is cooled, by means of the secondary cooling circuit 122 and the third heat exchanger 120 in particular, to a temperature of preferably 0° C. In a particularly preferred mode of operation, the secondary cooling circuit is used to cool the beverage to a temperature at which the beverage is supercooled to a temperature between 0° and −5° C. Because the temperature of the beverage leaving the second heat exchanger 118 is within a relatively small window, the third heat exchanger may be dimensioned for an small and accurate decrease of temperature of the beverage in the dispensing line 104.

Figure 2A:
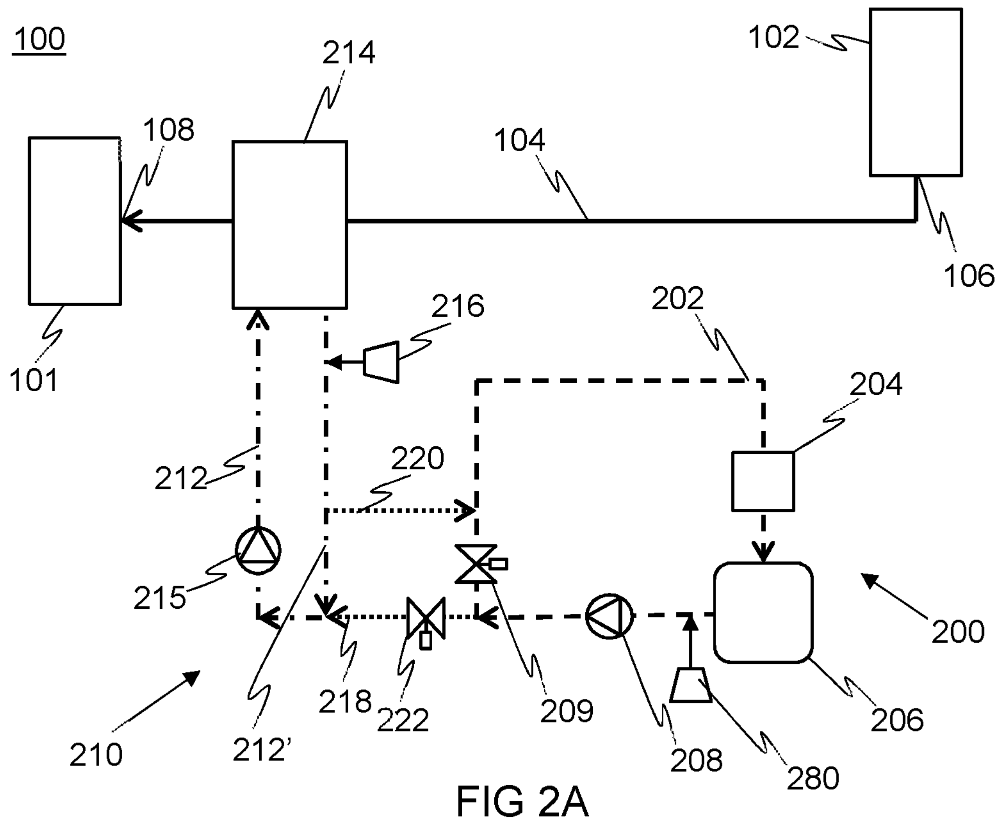
FIG. 2A shows an embodiment of a cooling device according to the second aspect.

FIG. 2A depicts an embodiment of a device for cooling a beverage 100 according to the second aspect, comprising the dispensing line 104. This particular embodiment comprises, as an option, a buffer module 200, comprising a buffer circuit 202 arranged to provide a buffer flow path for circulating coolant fluid.

The buffer module 200 comprises a buffer heat exchanger 204 arranged to exchange thermal energy with coolant fluid flowing through the buffer circuit 202. The buffer heat exchanger 204 may for example be placed in thermal contact with a separate cooling system, such as a vapour compression cooling system 132, arranged to extract thermal energy from the buffer heat exchanger 204. In another alternative, the buffer heat exchanger 204 is arranged for exchange of thermal energy between the cooling fluid and another medium, preferably an external medium, like air surrounding the device 100.

A buffer container 206 is provided, which buffer container 206 is arranged for storing a particular volume of coolant fluid. For example, the storage volume of the buffer container 206 may exceed the volume of coolant fluid which may be present inside the buffer circuit 202, or be at least half of the volume of cool fluid present inside the buffer circuit 202.

The buffer container 206 may be insulated to reduce transfer of thermal energy between the buffer container 206 and its surroundings. As a further option, the buffer container 206 may comprise or consist of or at least comprises one or more materials with a high thermal storage capacity, such as aluminium.

As an option, the cooling device 100 of FIG. 2A comprises a buffer pump 208 as a buffer flow controller for controlling a flow of coolant fluid in the buffer circuit. The cooling device 100 further comprises a recirculation valve 209 arrange to control circulation of coolant fluid through the buffer circuit 202.

When the recirculation valve 209 is in an open position, and the pump 208 is controlled to create a pressure difference in the coolant fluid in the buffer circuit 208, coolant fluid may flow from the buffer reservoir 206, through the pump 208, through the recirculation valve 209, past the buffer heat exchanger 204, and back into the buffer reservoir 206.

An optional buffer temperature sensor 280 may be provided, arranged for sensing a temperature of cooling fluid in the buffer circuit 202. In particular, the buffer temperature sensor 280 may be provided downstream of the buffer container 206 or inside the buffer container 206. A sensor signal of the buffer temperature sensor 280 may be used to control at least one of the pump 208 and the recirculation valve 209.

Depending on the flow rate of coolant fluid circulating through the buffer circuit 202, and the amount of the thermal energy exchanged at the buffer heat exchanger 204, the temperature of coolant fluid in the buffer container 206 may be controlled. For example, it may be a control objective to maintain the temperature of coolant fluid in the buffer container 206 inside a particular temperature window. The temperature window may depend on the desired dispensing temperature of the beverage, and a freezing point of the beverage.

The cooling module 210 of FIG. 2A further comprises a primary cooling circuit 212 providing a primary cooling flow path for circulating coolant fluid. Also comprised by the cooling module 210 is a primary cooling heat exchanger 214, arranged to allow exchange of thermal energy between beverage flowing through the dispensing line 104 and coolant fluid flowing through the primary cooling circuit 212. Hence, via the primary cooling flow path, coolant fluid may be circulated through the primary cooling heat exchanger 214, as visible in FIG. 2A. A primary cooling flow pump 215 is provided as a primary cooling flow controller comprised by a primary cooling flow module for controlling the flow of coolant fluid circulated through the primary cooling circuit 212.

The primary cooling circuit 212 is provided in fluid connection with the buffer circuit 202 by virtue of a supply conduit 218 and a return conduit 220. A connection valve 222 is as an option provided in the supply conduit 218, but may in other embodiments be provided in the return conduit 220. As a further option, both the supply conduit 218 and the return conduit 220 may be provided with a valve. In yet another alternative, the connections valve 222 and the recirculation valve 209 are implemented as a single three-way valve having the functionality of two valves. In yet another alternative, only one valve is provided in at least one of the primary cooling circuit 212 and the buffer circuit 202 to control distribution of coolant fluid from the primary cooling circuit 212 to the buffer circuit 202 and vice versa.

When the connection valve 222 is in an open state, a flow of coolant fluid may be constituted from the buffer container 206, via the supply conduit 218 to the primary cooling heat exchanger 214, and back to the buffer container 206 via the return conduit 220. As such, coolant fluid may be used to transfer thermal energy between the buffer heat exchanger 204 and the primary cooling heat exchanger 214.

By controlling at least one of the buffer pump 208, the primary cooling flow pump 215 and/or the connection valve 222, mixing of coolant fluid from the buffer circuit 202 into the primary cooling circuit 212 may be controlled. With this mixing, the temperature of coolant fluid in the primary cooling circuit 212 may be controlled, and in turn the amount of cooling of the primary cooling heat exchanger 214 may be controlled. The amount of coolant fluid mixed into the primary cooling circuit 212 may be returned to the buffer circuit 202 via the return conduit 220. By mixing coolant fluid from the buffer circuit 202 into the primary cooling circuit 212, with coolant fluid in the primary cooling circuit 212, temperature decrease of the coolant fluid in the primary cooling circuit 212 may be accurately controlled, by mixing in small amounts of (cooler) coolant fluid from the buffer circuit 202.

It may for example be preferred to keep the temperature of coolant fluid provided to the primary cooling heat exchanger 214—or any other heat exchanger—above a freezing point of the beverage. Otherwise, beverage may freeze inside the dispensing line 104 at a heat exchanger, which may inhibit the flow of beverage through the dispensing line 104. In another scenario, it may be preferred to cool the temperature of a beverage in the dispensing line to a temperature to provide a supercooled beverage in the dispensing line.

As can been seen for example in FIG. 2A, the primary cooling circuit 212 comprises or forms a closed loop cooling flow path for circulating coolant fluid through, in particular independent of the buffer circuit. The closed loop is closed by virtue of conduit section 212'. As such, the primary cooling circuit 212 may be connected in parallel with the buffer circuit 202 via the supply conduit 218 and the return conduit 220. The supply conduit 218 and the return conduit 220 may be bypassed by virtue of conduit section 212', for example when one or both of the recirculation valve 209 and the connection valve 222 are closed.

A closed loop in general means that at least part of a fluid flowing over the closed loop stays in the closed loop after the closed loop has been flown through fully. Only in particular embodiments, closed loop shall mean that all of the fluid flowing over the closed loop stays in the closed loop after the closed loop has been flown through fully.

For example when one or both of the recirculation valve 209 and the connection valve 222 are closed, the primary cooling flow pump 215 may be operated independently from the pump 208, or more in general, the primary cooling flow module may be operated at least partially independent from the buffer flow module.

As an option, a first temperature sensor 216 is provided for sensing a first temperature of coolant fluid flowing through the primary cooling circuit. In the embodiment of FIG. 2A, the first temperature sensor 216 is provided downstream of the primary cooling heat exchanger 214.

To control the recirculation valve 209 and the connection valve 222, the cooling device 100 may comprise a processing unit. This processing unit may be arranged to at least partially close the recirculation valve 209 and/or at least partially open the connection valve 222 if the temperature sensed by the first temperature sensor 216 exceeds a first temperature threshold. As such, colder coolant fluid from the buffer circuit may be mixed into the primary cooling circuit 212.

The processing unit may be further arranged to at least partially open the recirculation valve 209 and at least partially close the connection valve 222 if a further requirement is met. Such a further requirement may for example be that the temperature sensed by the first temperature sensor 216 falls below a second temperature threshold. As such, less of the colder coolant fluid from the buffer circuit may be mixed into the primary cooling circuit 212.

Figure 2B:
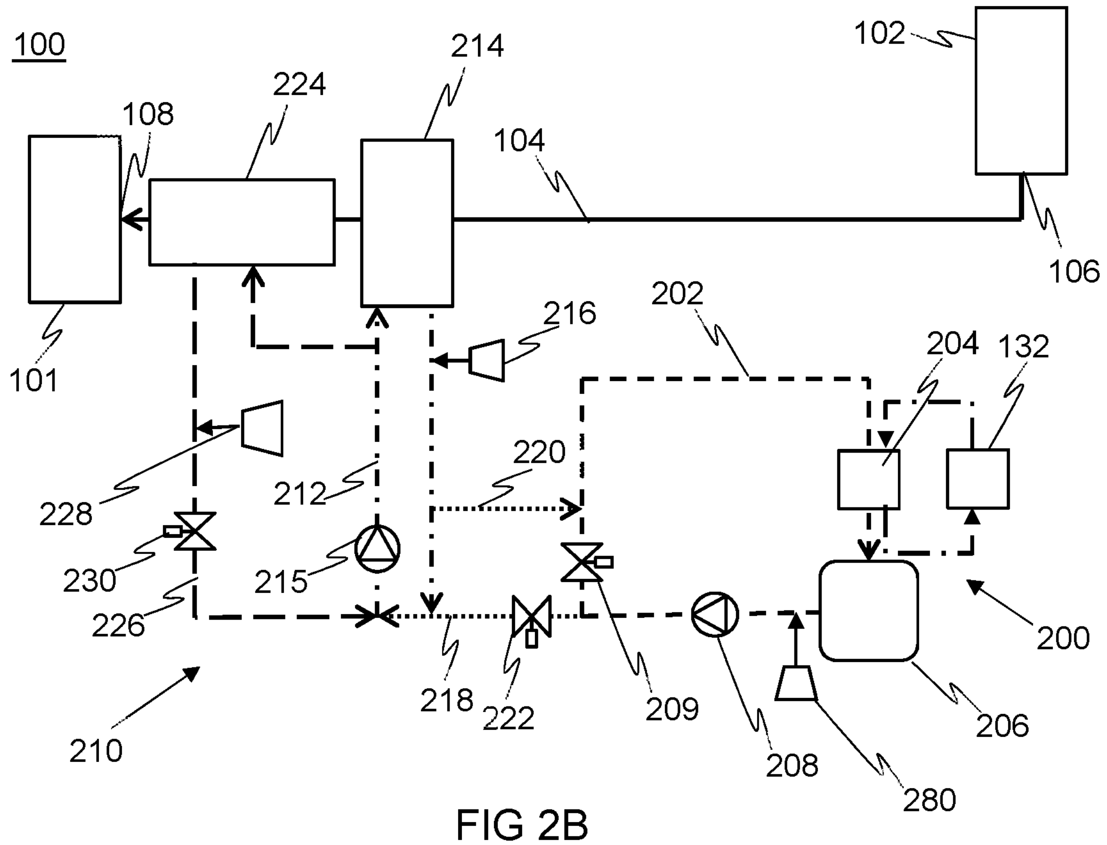
FIG. 2B shows another embodiment of a cooling device according to the second aspect.

FIG. 2B shows another embodiment of a cooling device 100 according to the second aspect, wherein the cooling module 210 further comprises a secondary cooling circuit 226 providing a secondary cooling flow path for coolant fluid. Provided in the secondary cooling flow path is a secondary cooling heat exchanger 224 arranged to allow exchange of thermal energy between beverage flowing through the dispensing line 104 and coolant fluid flowing through the secondary cooling circuit 226.

Relative to the dispensing line 104, the secondary cooling heat exchanger 224 is provided downstream of the primary cooling heat exchanger 214. The primary cooling circuit 212 with the primary cooling heat exchanger 214 and the secondary cooling circuit 226 with the secondary cooling heat exchanger 224 may be operated as discussed in conjunction with FIG. 1; the primary cooling circuit 212 may be operated to provide temperature of beverage in the dispensing line 104 within a particular temperature window and the secondary cooling circuit 226 may be operated to provide beverage at a target temperature.

As shown in FIG. 2B, the secondary cooling circuit 226 is connected parallel to the primary cooling circuit 212. In particular, at a first end, the secondary cooling circuit 226 is connected upstream of the primary cooling flow pump 215, and at a second end, the secondary cooling circuit 226 is connected downstream of the primary cooling flow pump 215.

The secondary cooling circuit 226 may form a closed loop circuit, optionally together with part of another circuit, such as the primary cooling circuit 212. Fluid flowing through the secondary cooling circuit 226 as a closed loop circuit, for example when one or both of the recirculation valve 209 and the connection valve 222 are closed, may flow independent of the buffer circuit 202. When an embodiment of a cooling device 100 comprises a tertiary cooling circuit, the tertiary cooling circuit may also form a closed loop circuit, optionally together with part of another circuit.

In the embodiment of FIG. 2B, a secondary cooling flow valve 230 is provided as a secondary cooling flow controller arranged to control a flow of coolant fluid through the secondary cooling circuit. In an at least partially opened state, and the primary cooling flow pump 215 active, a flow of coolant fluid may be constituted through the secondary cooling circuit 226. As such, the secondary cooling heat exchanger 224 may be used to cool beverage flowing through the dispensing line 104, or at least maintain a temperature of beverage flowing through the dispensing line 104. Alternatively or additionally, the secondary cooling circuit 226 is provided with a dedicated pump.

As an example, the secondary cooling flow valve 230 is positioned downstream of the secondary cooling heat exchanger 224. In other examples, the secondary cooling flow valve 230 may be positioned upstream of the secondary cooling heat exchanger 224.

A second temperature sensor 228 may be provided, arranged for sensing a temperature of cooling fluid flowing through the secondary cooling circuit 226. As an example, as shown in FIG. 2B, the second temperature sensor 228 is position downstream of The secondary cooling flow valve 230 may be controlled based on the temperature sensed by the second temperature sensor 228. In a particular controller state, when the temperature sensed by the second temperature sensor 228 exceeds a particular threshold, the secondary cooling flow valve 230 may be opened further to increase the flow rate of coolant fluid through the secondary cooling circuit 226.

Because the secondary cooling circuit 226 is connected to the primary cooling circuit 212, mixing of coolant from the buffer circuit 202 into the primary cooling circuit 212 may also result in mixing of coolant from the buffer circuit 202 into the secondary cooling circuit 226.

Figure 3A:
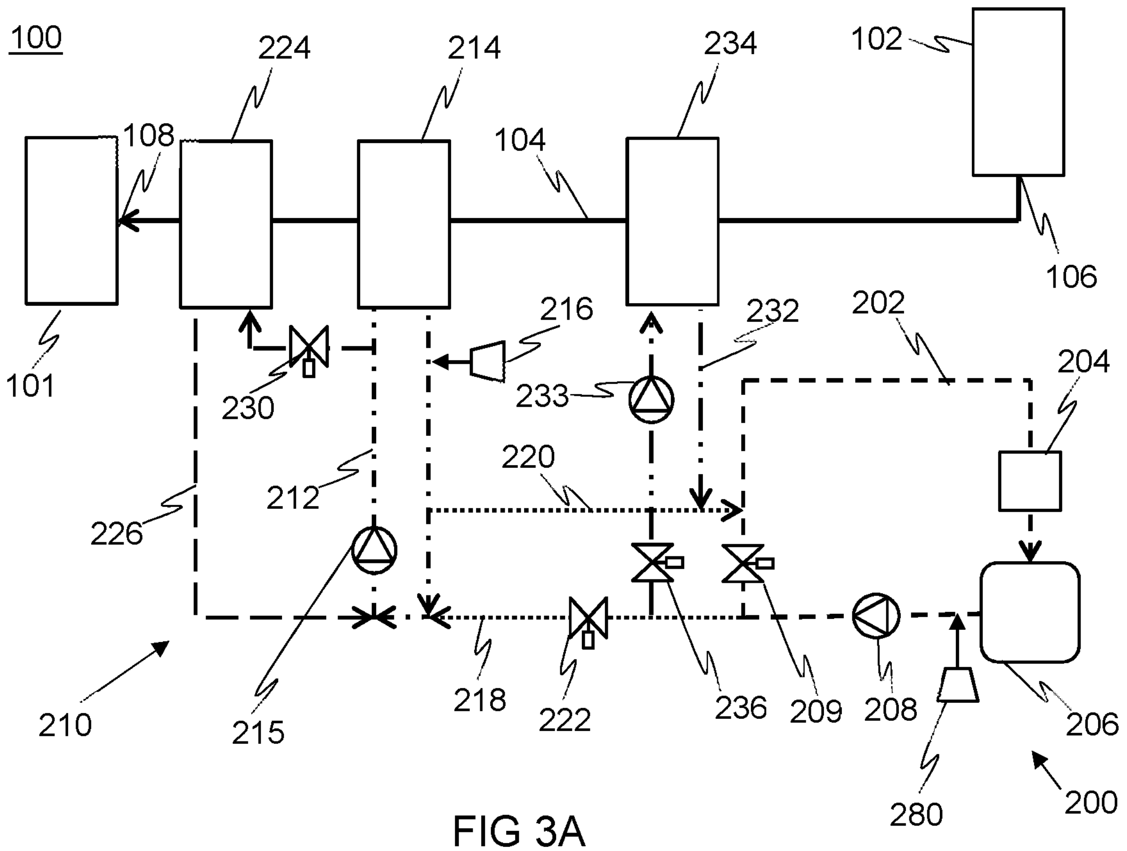
FIG. 3A shows yet another embodiment of a cooling device according to the second aspect.
Figure 3B:
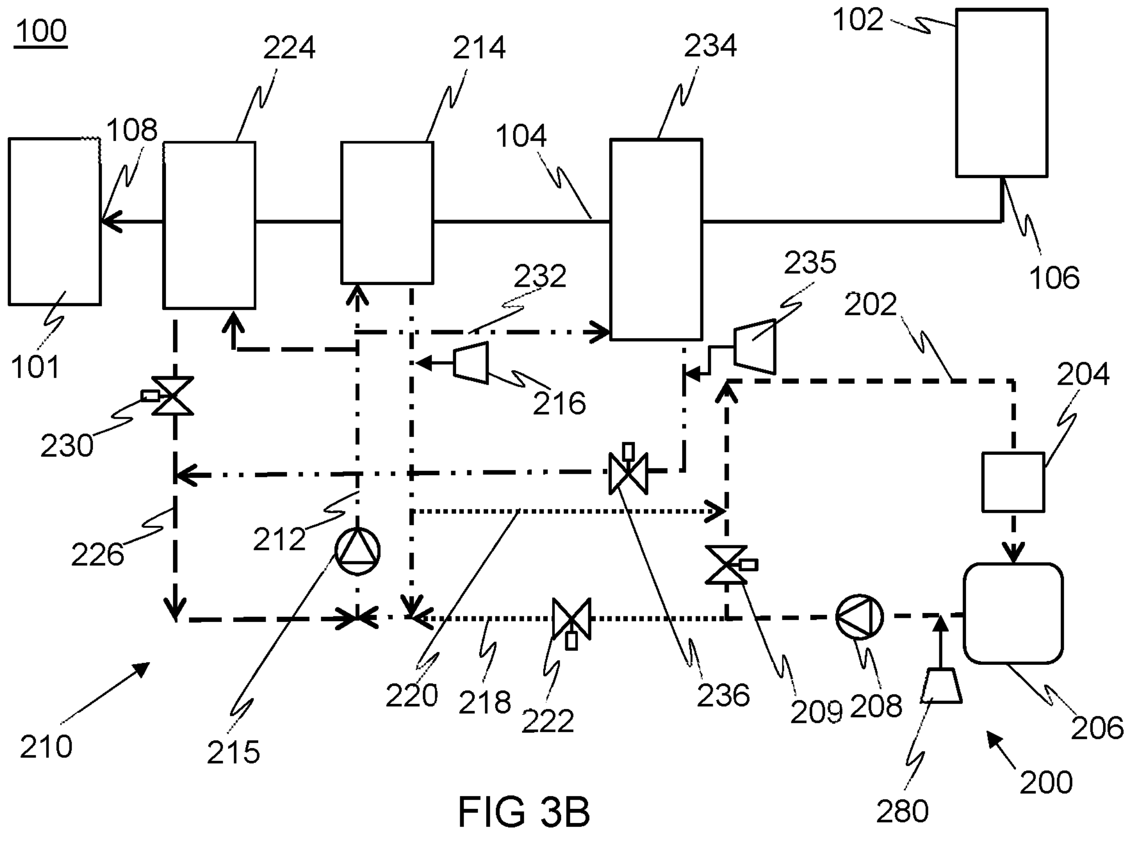
FIG. 3B shows an even further embodiment of a cooling device according to the second aspect.

FIGS. 3A and 3B depict further embodiments of a cooling device 100 according to the second aspect. These particular embodiments both comprise an optional tertiary cooling circuit 232 providing a tertiary cooling flow path for coolant fluid. In both embodiments, the secondary cooling circuit 226 is optional.

The cooling device 100 in the embodiments of FIGS. 3A and 3B further comprises a tertiary cooling heat exchanger 234 arranged to allow exchange of thermal energy between beverage flowing through the dispensing line 104 and coolant fluid flowing through the tertiary cooling circuit 232.

Relative to the dispensing line 104, the tertiary cooling heat exchanger 234 is provided upstream of the primary cooling heat exchanger 214. The primary cooling circuit 212 with the primary cooling heat exchanger 214, the secondary cooling circuit 226 with the secondary cooling heat exchanger 224 and the tertiary cooling circuit 232 with the tertiary cooling heat exchanger 234 may be operated as discussed in conjunction with FIG. 1.

In such scenario, the tertiary cooling circuit 232 may be operated to provide temperature of beverage in the dispensing line 104 within a particular temperature window and the primary cooling circuit 212 may be operated to provide beverage at a target temperature. Furthermore, in this embodiment, the secondary cooling circuit 226 may be advantageous for maintaining temperature of beverage in the dispensing line 104 or even further cooling of the beverage during transport to the tap 101. This is particularly advantageous in case the dispensing line 104 is relatively long, in particular between the primary cooling heat exchanger 214 and the beverage outlet 108 and the tap 101.

A tertiary cooling flow valve 236 is provided as a tertiary cooling flow controller for controlling a flow of coolant fluid through the tertiary cooling circuit 232. As depicted respectively in FIGS. 3A and 3B, the tertiary cooling flow valve 236 may be provided upstream or downstream of the tertiary cooling heat exchanger 234.

As an option depicted in FIG. 3A, the tertiary cooling flow controller may comprise a tertiary pump 233, additionally to or as an alternative to the tertiary cooling flow valve 236.

The tertiary cooling circuit 232 is provided in fluid connection with the buffer circuit 202 to receive coolant fluid from the buffer circuit 202 and to return coolant fluid to the buffer circuit 202.

In the embodiment shown in FIG. 3A, the tertiary cooling circuit 232 is at a first end connected to the supply conduit 218, for example upstream of the connection valve 222. At a second end, the tertiary cooling circuit 232 is connected to the return conduit 220.

In the embodiment shown in FIG. 3B, the tertiary cooling circuit 232 is at a first end connected to the primary cooling circuit 212, for example downstream of the primary cooling flow pump 215. At a second end, the tertiary cooling circuit 232 is connected to the secondary cooling circuit 262, for example downstream of the secondary cooling flow valve 230.

As depicted in FIG. 3B, as an option, a tertiary temperature sensor 235 may be provided, arranged to sense a temperature of coolant fluid flowing through the tertiary cooling circuit 232. Based on this sensed temperature, the tertiary cooling flow controller may be controlled to increase or decrease the flow rate of coolant fluid through the tertiary cooling circuit 232.

As an option which may be present in any embodiment of a cooling device 100, a flow sensor may be used for providing a sensor signal indicative of a flow of beverage through the dispensing line. Such a flow may for example be expressed in litres/minute. The flow may be indicative of the amount of cooling required, where a higher flow will typically require a larger cooling capacity. The cooling capacity of the cooling device may be temporarily decreased when the sensor signal is indicative of substantially no flow of beverage through the dispensing line, for example by controlling one or more flow controllers comprised by the cooling device.

Different cooling states may be achieved by controlling the flow controllers comprised by the cooling device 100. In embodiments of the cooling device 100, in a primary cooling state, only the primary cooling circuit 212 with the primary cooling heat exchanger 214 may be used for cooling beverage flowing through the dispensing line 104. In further cooling states, one or both of the secondary cooling circuit 226 with the secondary cooling heat exchanger 224 and the tertiary cooling circuit 232 with the tertiary cooling heat exchanger 234 may be used for cooling beverage flowing through the dispensing line 104.

For example using a second embodiment of a cooling device, for example depicted in FIGS. 2A-3B, a method of cooling a dispensing line 104 is envisioned. The method comprises the steps of cooling a coolant fluid in a buffer circuit, transporting the cooled coolant fluid from the buffer circuit into a primary cooling circuit via an at least partially opened connection valve, circulating the coolant fluid through a closed loop cooling flow path of the primary cooling circuit, and while the coolant fluid circulates through the closed loop cooling flow path, passing the coolant fluid to flow through a primary cooling heat exchanger to allow exchange of thermal energy between beverage in the dispensing line and the coolant fluid.

It will be appreciated that the method may be used with different examples of the second embodiment of the cooling device, with any combination of the optional features as disclosed herein.

In the method, during at least part of the circulating of the coolant fluid through the closed loop cooling flow path of the primary cooling circuit, the connection valve may be closed. With the connection valve closed, it may be essentially prevented that coolant fluid flows between the buffer circuit and the primary cooling circuit.

The connection valve may be controlled based on a determined temperature of the coolant fluid circulating in the primary cooling circuit, and the method may hence comprise a step of determining said temperature.

In the method, the coolant fluid may be circulated through the closed loop cooling flow path of the primary cooling circuit using a pump positioned in the closed loop cooling flow path of the primary cooling circuit. This pump, for example primary cooling flow pump 215, may be controlled independently of buffer pump 208.

In general for controlling one or more valves and/or pumps comprised by any embodiment of the cooling device (100), the cooling device may comprise a control unit, for example comprising an electronic processing unit and a memory comprising instruction, which, when executed by the control unit, cause the control unit to carry out at least parts of the method of cooling the dispensing line.

Regardless of which cooling heat exchangers are used for cooling beverage flowing through the dispensing line 104, using the buffer flow controller, coolant fluid may be circulated through the buffer circuit 202 in any cooling state.

In summary, firstly, a device is provided for cooling a beverage, comprising a dispensing line, and a cooling module comprising a primary cooling circuit for providing a primary cooling flow path for coolant fluid, a first heat exchanger for exchanging thermal energy with coolant fluid flowing through the primary cooling circuit, a primary cooling flow controller for controlling a flow of coolant fluid in the primary cooling circuit, a second heat exchanger for allowing exchange of thermal energy between beverage flowing through the dispensing line and coolant fluid flowing through the primary cooling circuit, a secondary cooling circuit, providing a secondary cooling flow path for coolant fluid parallel to the primary cooling circuit, a secondary cooling flow controller for controlling a flow of coolant fluid in the secondary cooling circuit, and a third heat exchanger, allowing exchange of thermal energy between beverage flowing through the dispensing line and coolant fluid flowing through the secondary cooling circuit.

Secondly, a device is provided for cooling a beverage, comprising a dispensing line, a buffer module comprising a buffer circuit arranged to provide a buffer flow path for circulating coolant fluid, a buffer heat exchanger arranged to exchange thermal energy with coolant fluid flowing through the buffer circuit, a buffer container for storing coolant fluid, a buffer flow controller for controlling a flow of coolant fluid in the buffer circuit, and a recirculation valve arranged to control circulation of coolant fluid through the buffer circuit, and a cooling module for receiving coolant fluid from the buffer circuit and arranged to us the coolant fluid for cooling a beverage flowing through the dispensing line.

In summary, various aspects and implementations thereof relate to a cooling device comprising a buffer circuit comprising a cooling unit for cooling coolant and a reservoir for buffering cooled coolant and a primary cooling circuit for providing coolant to a first heat exchanger. The first heat exchanger is arranged for exchange of thermal energy between the coolant and beverage in a dispensing line. The primary cooling circuit and the buffer circuit are connected to enable exchange of coolant. The cooling device comprises a coolant distribution module arrange to control exchange of coolant between the primary cooling circuit and the buffer circuit. The coolant distribution module may control at least one of valves as passive components and pumps as active components, in at least one of the primary cooling circuit and the buffer circuit. The coolant distribution module may operate based on coolant temperature in the primary cooling circuit.

In summary, the various aspects and implementations thereof also relate to a cooling device for cooling a beverage in a dispensing line. The device comprises two heat exchangers for exchanging thermal energy between the beverage and a coolant fluid in a cooling circuit; the coolant fluid having a lower temperature than the beverage. Placing the two heat exchangers in series relative to the dispensing line, provides two-stage cooling, allowing more accurate cooling. This may be improved by placing brute force cooling to a particular temperature window, followed by accurate cooling. This makes the cooling process is less sensitive to whatever the initial temperature of the beverage may be. Relative to the cooling circuit for the coolant, the two heat exchangers may be placed in parallel and, optionally, further in parallel to a buffer circuit. A distribution module may be provided to control distribution of coolant over the heat exchangers, optionally from the buffer, to control temperature of the beverage.

Various implementations, in particular relating to a device according to the first aspect, may also be summarised as follows:

1. Device for cooling a beverage, the device comprising:
 a dispensing line comprising a beverage inlet at a proximal end of the dispensing line for receiving the beverage and a beverage outlet for dispensing the beverage, the dispensing line providing a beverage flow path between the beverage inlet and the beverage outlet;
 a cooling module comprising:
 a primary cooling circuit arranged to provide a primary cooling flow path for coolant fluid;
 a first heat exchanger arranged to exchange thermal energy between coolant fluid flowing through the primary cooling circuit and an external medium;
 a primary cooling flow controller arranged to control a flow of coolant fluid in the primary cooling circuit;
 a second heat exchanger arranged to allow exchange of thermal energy between beverage flowing through the dispensing line and the coolant fluid flowing through the primary cooling circuit;
 a secondary cooling circuit, arranged to provide a secondary cooling flow path for the coolant fluid;
 a secondary cooling flow controller arranged to control a flow of coolant fluid in the secondary cooling circuit; and
 a third heat exchanger, arranged to allow exchange of thermal energy between beverage flowing through the dispensing line and coolant fluid flowing through the secondary cooling circuit.

2. Device according to any of the preceding implementations, wherein the secondary cooling circuit is connected to the primary cooling circuit such that secondary cooling flow path is provided parallel to the primary cooling flow path.

3. Device according to implementation 1 or 2, wherein relative to the beverage flow path, the third heat exchanger is provided downstream of the second heat exchanger.

4. Device according to any of the preceding implementations, further comprising a first temperature sensor for sensing a temperature of coolant fluid flowing through the primary cooling circuit, and wherein the primary cooling flow controller is arranged for controlling the flow of coolant fluid through the primary cooling circuit in response to a first temperature sensed by the first temperature sensor.

5. Device according to implementation 4, to the extent dependent on implementation 3, wherein the primary cooling flow controller is arranged to control the flow of coolant fluid to keep the first temperature within a first pre-determined temperature window.

6. Device according to any of the preceding implementations, further comprising a second temperature sensor for sensing a temperature of coolant fluid flowing through the secondary cooling circuit, and wherein the secondary cooling flow controller is arranged for controlling the flow of coolant fluid through the secondary cooling circuit in response to a second temperature sensed by the second temperature sensor.

7. Device according to implementation 6, to the extent dependent on implementation 3, wherein the secondary cooling flow controller is arranged to control the flow of coolant fluid to keep the second temperature within a second pre-determined temperature window.

8. Device according to implementation 7, to the extent dependent on implementation 5, wherein the first pre-determined temperature window is smaller than the second pre-determined temperature window.

9. Device according to implementation 4 to 8, to the extent dependent on implementation 4, wherein the first temperature sensor is arranged for sensing a temperature of the cooling fluid flowing through the primary cooling circuit, downstream of the second heat exchanger.

10. Device according to any of the implementations 6 to 8, wherein the second temperature sensor is arranged for sensing a temperature of the cooling fluid flowing through the secondary cooling circuit, downstream of the third heat exchanger.

11. Device according to any of the preceding implementations, wherein the secondary cooling circuit is connected to the primary cooling circuit at two ends of the secondary cooling circuit, the primary cooling flow controller comprises a pump, and a first of the two ends is connected downstream of the pump.

12. Device according to any of the preceding implementations, the cooling module further comprising:

a buffer module comprising:

a buffer circuit arranged to provide a buffer flow path for circulating coolant fluid;

the first heat exchanger;

a buffer container for storing coolant fluid; and a buffer flow module controller for controlling a flow of coolant fluid in the buffer circuit;

a coolant fluid distribution module for controlling exchange of coolant fluid between the buffer module and at least one of the second heat exchanger and the third heat exchanger.

13. Device according to implementation 12, to the extent dependent on implementation 4, wherein the coolant fluid distribution module is arranged to control exchange of coolant fluid in response to the first temperature.

14. Device according to implementation 12 or 13, to the extent dependent on implementation 6, wherein the coolant fluid distribution module is arranged to control exchange of coolant fluid in response to the second temperature.

15. Device according to any of the implementations 12 to 14, wherein coolant fluid distribution module comprises at least one of valves and pumps provided in at least one of the buffer flow path, primary cooling flow path and secondary cooling flow path.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

The invention claimed is:

1. A device for cooling a beverage, the device comprising:

a dispensing line comprising a beverage inlet at a proximal end of the dispensing line for receiving the beverage and a beverage outlet for dispensing the beverage, the dispensing line providing a beverage flow path between the beverage inlet and the beverage outlet;

a buffer module comprising:

a buffer circuit arranged to provide a buffer flow path for circulating coolant fluid;

a buffer heat exchanger arranged to exchange thermal energy between coolant fluid in the buffer circuit and an external medium;

a buffer container for storing coolant fluid; and a buffer flow module for controlling a flow of coolant fluid in the buffer circuit;

a cooling module, comprising:

a primary cooling circuit providing a primary cooling flow path for circulating coolant fluid;

a primary cooling heat exchanger arranged to allow exchange of thermal energy between beverage in the dispensing line and coolant fluid in the primary cooling circuit;

a primary cooling flow module for controlling a flow of coolant fluid through the primary cooling circuit;

a supply conduit providing a supply flow path for coolant fluid between the buffer circuit and the primary cooling circuit, upstream of the primary cooling flow controller; and a return conduit providing a return flow path for coolant fluid between the buffer circuit and the primary cooling circuit, downstream of the primary cooling heat exchanger;

wherein the primary cooling circuit comprises a closed loop cooling flow path arranged to circulate coolant fluid through, in particular independent of the buffer circuit.

2. The device of claim 1, wherein the buffer flow module comprises at least one of:

a buffer flow controller for controlling a flow of coolant fluid in the buffer circuit; and a recirculation valve arranged to control circulation of coolant fluid through the buffer circuit.

3. The device of claim 1, wherein the primary cooling flow module comprises at least one of:

a primary cooling flow controller for controlling a flow of coolant fluid through the primary cooling circuit; and a connection valve provided in one of the supply conduit and the return conduit arranged to control flow of coolant fluid between the primary cooling circuit and the buffer circuit.

4. The device of claim 1, further comprising a first temperature sensor for sensing a first temperature of coolant fluid flowing through the primary cooling circuit.

5. The device according to claim 4, wherein the first temperature sensor is arranged for sensing a temperature of cooling fluid flowing through the secondary cooling circuit, downstream of the primary cooling heat exchanger.

6. The device of claim 4, further comprising a processing unit arranged to control the buffer flow module and the primary cooling flow module to:

perform at least one of decreasing throughput of the buffer flow module and increasing throughput of the primary cooling flow module if the first temperature meets a first requirement; and increasing throughput of the buffer flow module and decreasing throughput of the primary cooling flow module if a further requirement is met.

7. The device according to claim 6, further comprising:

a secondary cooling circuit providing a secondary cooling flow path for coolant fluid; and a secondary cooling heat exchanger arranged to allow exchange of thermal energy between beverage flowing through the dispensing line and coolant fluid flowing through the secondary cooling circuit;

a second temperature sensor arranged for sensing a temperature of cooling fluid flowing through the secondary cooling circuit; and a secondary cooling flow controller arranged to control a flow of coolant fluid through the secondary cooling circuit in response to the temperature sensed by the second temperature sensor;

wherein the secondary cooling circuit is connected parallel to the primary cooling circuit, and the secondary cooling heat exchanger is provided in thermally conductive contact with the dispensing line downstream of the primary cooling heat exchanger.

8. The device according to claim 7, wherein the secondary cooling flow controller is at least one of a valve and a pump.

9. The device according to claim 1, further comprising:

a secondary cooling circuit providing a secondary cooling flow path for coolant fluid; and a secondary cooling heat exchanger arranged to allow exchange of thermal energy between beverage flowing through the dispensing line and coolant fluid flowing through the secondary cooling circuit;

wherein the secondary cooling circuit is connected parallel to the primary cooling circuit, and the secondary cooling heat exchanger is provided in thermally conductive contact with the dispensing line downstream of the primary cooling heat exchanger.

10. The device according to claim 9, wherein the secondary cooling circuit is connected to the primary cooling circuit upstream of the primary cooling flow controller as well as downstream of the primary cooling flow controller.

11. The device according to claim 9, wherein relative to the dispensing line, the secondary cooling heat exchanger is positioned downstream of the primary cooling heat exchanger.

12. The device according to claim 1, further comprising:

a tertiary cooling circuit providing a tertiary cooling flow path for coolant fluid;

a tertiary cooling heat exchanger arranged to allow exchange of thermal energy between beverage flowing through the dispensing line and coolant fluid flowing through the tertiary cooling circuit; and a tertiary cooling flow controller for controlling a flow of coolant fluid through the tertiary cooling circuit;

wherein the tertiary cooling circuit is in fluid connection with the buffer circuit.

13. The device according to claim 12, wherein the tertiary cooling circuit is connected between the supply conduit and the return conduit.

14. The device according to claim 12, further comprising:

a secondary cooling circuit providing a secondary cooling flow path for coolant fluid, wherein the tertiary cooling circuit is connected between the primary cooling circuit and the secondary cooling circuit, in series with the secondary cooling circuit.

15. The device according to claim 12, further comprising:

a secondary cooling circuit providing a secondary cooling flow path for coolant fluid; and a secondary cooling heat exchanger arranged to allow exchange of thermal energy between beverage flowing through the dispensing line and coolant fluid flowing through the secondary cooling circuit;

wherein:

the tertiary cooling circuit is connected parallel to the primary cooling circuit and parallel to the secondary cooling circuit; and the secondary cooling circuit is connected parallel to the primary cooling circuit, and the secondary cooling heat exchanger is provided in thermally conductive contact with the dispensing line downstream of the primary cooling heat exchanger.

16. The device according to claim 12, wherein relative to the dispensing line, the tertiary cooling heat exchanger is positioned upstream of the primary cooling heat exchanger.

17. A method of cooling a dispensing line comprising a beverage inlet at a proximal end of the dispensing line for receiving the beverage and a beverage outlet for dispensing the beverage, the dispensing line providing a beverage flow path between the beverage inlet and the beverage outlet, the method comprising the steps of:

cooling a coolant fluid in a buffer circuit;

transporting the cooled coolant fluid from the buffer circuit into a primary cooling circuit via an at least partially opened connection valve;

circulating the coolant fluid through a closed loop cooling flow path of the primary cooling circuit; and while the coolant fluid circulates through the closed loop cooling flow path, passing the coolant fluid through a primary cooling heat exchanger to allow exchange of thermal energy between beverage in the dispensing line and the coolant fluid.

18. The method according to claim 17, wherein during at least part of the circulating of the coolant fluid through the closed loop cooling flow path of the primary cooling circuit, the connection valve is closed.

19. The method according to claim 17, further comprising the steps of:

determining a temperature of the coolant fluid circulating in the primary cooling circuit; and controlling the connection valve based on the determined temperature.

20. The method according to claim 17, wherein the coolant fluid is circulated through the closed loop cooling flow path of the primary cooling circuit using a pump positioned in the closed loop cooling flow path of the primary cooling circuit.

* * * * *